United States Patent [19]

Meissner et al.

[11] Patent Number: 4,539,309

[45] Date of Patent: Sep. 3, 1985

[54] PREPARATION OF A CATALYST FOR THE OXIDATION OF SULFUR DIOXIDE TO SULFUR TRIOXIDE

[75] Inventors: Ruprecht Meissner, Weisenheim; Norbert Neth, Bobenheim-Roxheim, both of Fed. Rep. of Germany

[73] Assignee: BASF Aktiengesellschaft, Fed. Rep. of Germany

[21] Appl. No.: 624,096

[22] Filed: Jun. 25, 1984

[30] Foreign Application Priority Data

Jun. 25, 1983 [DE] Fed. Rep. of Germany ....... 3322940

[51] Int. Cl.³ .......................... B01J 23/04; B01J 23/22

[52] U.S. Cl. .................................... 502/247; 502/243; 502/312; 502/344; 502/353; 423/535

[58] Field of Search ............... 502/312, 247, 243, 353, 502/246, 344; 423/535, 533

[56] References Cited

U.S. PATENT DOCUMENTS

| | | | |
|---|---|---|---|
| 3,107,223 | 10/1963 | Royer et al. | 502/247 |
| 3,186,794 | 6/1965 | Davies | 23/175 |
| 3,275,406 | 9/1966 | Krempff | 423/535 |
| 3,755,549 | 8/1973 | Guth | 423/533 |
| 3,793,230 | 2/1974 | Dorn et al. | 502/247 |
| 3,962,137 | 6/1976 | Taylor | 502/247 |
| 4,485,190 | 11/1984 | Sherif | 423/535 |

FOREIGN PATENT DOCUMENTS

| | | |
|---|---|---|
| 1086218 | 8/1957 | Fed. Rep. of Germany . |
| 1091547 | 10/1960 | Fed. Rep. of Germany . |
| 2919662 | 5/1979 | Fed. Rep. of Germany . |

OTHER PUBLICATIONS

*Chemisches Zentralblatt*, 1963, Nr. 15, pp. 5693 and 5761.

*Sulphur*, No. 138, Sep./Oct. 1978, pp. 39–41.

*Primary Examiner*—D. E. Gantz
*Assistant Examiner*—Anthony McFarlane
*Attorney, Agent, or Firm*—Keil & Weinkauf

[57] ABSTRACT

Catalysts for the oxidation of sulfur dioxide to sulfur trioxide, consisting of a silica-based carrier and, applied on this, an active substance containing vanadium and alkali metal compounds, are prepared by dissolving vanadium pentoxide in an alkali solution, acidifying the solution with sulfuric acid, mixing the acidified solution with the carrier, molding the mixture and drying and calcining the molding. To obtain mechanically stable catalysts, a dissolved alkali metal silicate and/or silica sol are added to the alkaline solution before acidification, the latter process is carried out at below 35° C. and the solution is then immediately incorporated into the carrier. The resulting moist crumbly material contains from 2 to 6% by weight of $V_2O_5$, from 35 to 45% by weight of $H_2O$ and from 15 to 50% by weight of $SiO_2$. From 5 to 25% by weight of the total silica content originates from the dissolved alkali metal silicate and/or silica sol.

3 Claims, No Drawings

PREPARATION OF A CATALYST FOR THE OXIDATION OF SULFUR DIOXIDE TO SULFUR TRIOXIDE

The present invention relates to a process for the preparation of a catalyst for the oxidation of sulfur dioxide to sulfur trioxide.

For the preparation of sulfuric acid on an industrial scale, sulfur dioxide is oxidized with oxygen or an oxygen-containing gas in the presence of a catalyst to give sulfur trioxide, which is then reacted with water to form sulfuric acid. The oxidation of the sulfur dioxide is carried out using, in particular, catalysts containing vanadium oxide. These catalysts generally consist of vanadium pentoxide applied onto a carrier, in particular an amorphous silica, an alkali metal compound being added to effect activation.

A large number of processes have been disclosed for the preparation of such catalysts. According to German Pat. No. 1,086,218, for example, a dissolved or suspended compound of tetravalent or pentavalent vanadium is brought into contact with an aqueous silicate solution, and kieselguhr is incorporated into the precipitate which contains a vanadium compound, silica and potassium and sodium compounds. The resulting product is dried, treated with sulfuric acid and then calcined.

According to German Pat. No. 1,091,547, a freshly precipitated silica gel containing sodium and/or potassium ions is employed as starting material; this is impregnated with vanadium pentoxide which has likewise been freshly precipitated and contains sodium and/or potassium ions. The product is dried and then brought into contact with sulfuric acid, and is calcined before use.

It has also been disclosed (Chem. Ztr. Bl. 1963, page 5761) that sulfuric acid catalysts can be prepared starting from a mixture of vanadium pentoxide and potassium bisulfate; this mixture is heated at 300°–400° C., the powdered mixture is kneaded with kieselguhr and a little water, and the dried paste is calcined at 400°–800° C. Instead of potassium bisulfate, it is also possible to use $K_2S_2O_7$, $K_2S_2O_8$ or $K_2SO_4+xH_2SO_4$.

Finally, German Laid-Open Application DOS No. 2,919,662 discloses a process for the preparation of a sulfuric acid catalyst, in which (a) vanadium pentoxide is dissolved in an amount of an aqueous solution of potassium hydroxide such that the molar ratio of $V_2O_5$ to $K_2O$ in the solution is from 0.2 to 0.8,
(b) the resulting solution is acidified with sulfuric acid to a pH<4,
(c) the suspension obtained is immediately mixed with a silica-based carrier to give a pasty material, with the proviso that the molar ratio of $SiO_2$ to $V_2O_5$ is from 13.0 to 45.0 and
(d) the material is molded and dried and
(e) is heated at 450°–650° C.

All of the processes described are intended to be used to prepare a catalyst which is highly active at both high and low temperatures, the activity depending primarily on the composition and amount of the active component and the porosity of the ready-prepared catalyst.

Moreover, the catalyst moldings have to be extremely resistant to mechanical loads during transport from the manufacturer to the user, during charging of the reactor and during operation itself, i.e. the moldings must exhibit high strength and low abrasion.

It is known (Sulphur 138, September/October 1978, page 39) that, in the case of the catalysts available commercially, mechanical robustness and high activity frequently conflict with one another. For example, high porosity, which is indispensable for high activity, is usually accompanied by high abrasion and poor hardness.

It is an object of the present invention to provide a process for the preparation of a catalyst for the oxidation of sulfur dioxide to sulfur trioxide, consisting of a silica-based carrier and, applied on this, an active substance containing vanadium and alkali metal compounds, by dissolving vanadium pentoxide in an alkali solution, acidifying the solution with sulfuric acid, mixing the acidified solution with the carrier, molding the mixture, drying and calcining. This catalyst should possess high catalytic activity coupled with high mechanical strength and a long life at high temperatures.

We have found that this object is achieved by a process in which (a) the vanadium pentoxide solution used additionally contains a dissolved alkali metal silicate and/or silica sol,
(b) this solution is brought to pH<2 with sulfuric acid by initially taking the required amount of sulfuric acid and introducing the solution into this, the temperature being kept below 35° C., and
(c) the acidified solution is immediately mixed with the solid silica-based carrier to give a moist crumbly material, which is then immediately molded, with the proviso that
(d) the moist crumbly material contains from 2 to 6% by weight of $V_2O_5$ and from 35 to 45% by weight of $H_2O$ and has a total $SiO_2$ content of from 15 to 50% by weight, from 5 to 25% by weight of the total silica having been introduced into the moist crumbly material together with the solution from (a).

In contrast to the conventional processes for the preparation of sulfuric acid catalysts, in the novel process the silica component is introduced not exclusively in the form of the carrier but also in the form of dissolved water glass and/or silica sol, which are added to the alkaline vanadate solution before the latter is acidified. The silica introduced in this manner has an advantageous effect on the properties of the ready-prepared catalyst. However, the essential feature in this connection is the fact that gelling of the silica thus introduced takes place only when molding of the catalyst material is complete.

In order to avoid premature gelling of this silica which has been introduced together with the vanadate solution, a temperature of 35° C. must not be exceeded during acidification of the alkaline vanadate solution with sulfuric acid. Furthermore, it is essential that the pH falls abruptly to below 2, i.e. the sulfuric acid is initially taken and the silica-containing alkaline vanadate solution is introduced into the sulfuric acid with thorough mixing. At the same time, the reaction solution must be cooled to prevent the temperature from exceeding 35° C.

The acidified solution thus obtained is immediately mixed with the carrier based on silica, preferably kieselguhr, after which the mixture is immediately molded, for example by extrusion or tableting. This prevents premature gelling of the silica introduced together with the vanadate solution, since gelling is not only a function of temperature and pH but also of time. Of course, the temperature of the material also should not exceed 35° C. during the incorporation of the carrier and the subsequent molding. The lower limits of the temperatures to be maintained are set virtually only by the solidification temperatures of the solutions used; however, for economic reasons these limits are not reached. As a rule, the neutralization as well as the incorporation of the silica carrier and the subsequent molding are therefore carried out at 15°-30° C.

The starting materials vanadic acid and silica (the latter both in the form of water glass or silica sol and in the form of the solid carrier) are employed in amounts such that the moist crumbly material formed when the alkaline vanadate solution is mixed with the silica carrier contains from 2 to 6% by weight of $V_2O_5$ and has a total $SiO_2$ content of from 15 to 50% by weight. From 5 to 25% by weight of the total silica content originates from the water glass or silica sol introduced together with the vanadium pentoxide solution or vanadate solution. The water contents of the components introduced in liquid form, i.e. of the alkali solutions, the water glass or the silica sol and the sulfuric acid, are adjusted so that the moist crumbly material contains from 35 to 45% by weight of $H_2O$. The alkali solutions and the water glass or the silica sol are employed in very concentrated form, while the concentration of the sulfuric acid is chosen so that it is about 20-40% by weight, in order to be able to control the temperature more easily during the reaction.

The water content of the moist crumbly material makes it possible to influence the porosity of the ready-prepared catalyst: the catalyst has a higher porosity when the water content is at the upper limit of the stated range than when the water content of the material being processed is in the region of the lower limit.

The catalysts according to the invention contain $V_2O_5$ and $SiO_2$, as in the conventional case, as well as $Na_2O$ and $K_2O$. The amount of $Na_2O$ in the moist crumbly material can be 0.3-2.5% by weight and the amount of $K_2O$ can be 5.0-11% by weight.

The alkali metal components are introduced into the mixture together with the water glass, which may be either potassium or sodium water glass, or together with the alkali solution, i.e. KOH or NaOH.

The silica carrier is incorporated into the acidified vanadate solution in a mixer, and care must be taken to ensure that the mixing process is terminated when the mixture attains a moist crumbly consistency. The free-flowing mixture can be molded by means of an extruder or the like. If mixing is carried out for too long a time, the mixture becomes pasty and can then be molded only with difficulty if at all. The material can be processed to solid extrudates, for example 2-10 mm in diameter, or to hollow extrudates.

The catalyst moldings are then dried at from 100° to 150° C. The increase in temperature also causes gelling of the silica introduced with the water glass or silica sol. This results in the formation of a silica framework, which has an extremely advantageous effect on the mechanical properties of the catalyst prepared according to the invention.

After drying, the catalyst moldings are calcined in a conventional manner at 350°-650° C.

Apart from the good mechanical properties, the catalyst prepared according to the invention also has a high activity, which may be attributable, inter alia, to the high pore volumes achievable and to the fact that the active material is finely dispersed in the carrier. This fine dispersion may also be due to the fact that, under the conditions according to the invention, the vanadium component too is only precipitated during drying, i.e. it is present in the dissolved state until after the molding procedure, so that thorough dispersing is ensured.

The criteria used in the Examples for assessing the quality of the catalyst are the conversion, the specific conversion, the pore volume, the cutting hardness, the abrasion and the high-temperature life.

These parameters are determined as follows:

(a) Determination of the conversion

The conversion C (%) of $SO_2$ to $SO_3$ is determined by measuring the $SO_2$ contents in the gas entering and leaving a reactor. The $SO_2$ contents are determined by titration against a chloramine solution. The values measured are the gas volumes required to decolorize 10 ml of a 0.1 N chloramine solution.

The oxidation of $SO_2$ takes place in two reactors connected in series, in each of which a constant preliminary conversion (about 87%) and the final conversion take place.

The catalyst bed volume is about 100 ml. The gas composition is 7.5 vol. % of $SO_2$, 11.0 vol. % of $O_2$ and 81.5 vol. % of $N_2$.

(b) Determination of the specific conversion

To take into account the possible effect of the amount of active component employed, the activity of the catalyst can be assessed using the specific conversion.

The specific conversion is the conversion of $SO_2$, based on the amount of vanadium pentoxide used and expressed in percent per g of $V_2O_5$.

(c) Determination of the pore volume 20 g of the catalyst are covered with toluene in a 100 ml beaker, which is covered. When gas is no longer released, the toluene is poured off and the sample is reweighed (G, in g).

$$\text{Pore volume in cm}^3/\text{g} = \frac{G - 20}{17.2}$$

(c) Determination of the cutting hardness

The force required to cut through an extrudate using a 0.3 mm blade is measured.

The blade is moved at a rate of 14 mm/minute, and the force is measured by means of a wire strain gage.

A total of 25 extrudates are cut through, and the forces determined are averaged.

(e) Determination of the abrasion

The sample is sieved using a 2 mm sieve. 100 g of sample which has not passed through the sieve are weighed into a 1 liter container, and 30 g of porcelain balls having a diameter of 10-11 mm are added. The container is then closed and then agitated for 2 hours on a vibratory mill at 1400 rpm and an amplitude of 10 mm. The fraction smaller than 2 mm is then determined. This value—based on the amount employed—gives the abrasion.

(f) Determination of the high-temperature life

About 120 g of the catalyst are introduced into a 250 ml reactor tube. The tube is heated at about 700° C. in a salt bath oven and is flushed with about 3 liters/hour of a gas consisting of 10 vol. % of $SO_2$, 11 vol. % of $O_2$ and 79 vol. % of $N_2$.

Thereafter, the abrasion of the entire sample is determined as a function of the life, as described under (e). Each sample is introduced only once.

In the Examples which follow, percentages are by weight, unless stated otherwise.

EXAMPLE 1

(A) Strength-increasing component: sodium water glass 41.5 kg of a 56% strength potassium hydroxide solution are stirred into 58 kg of sodium water glass (27.8% of $SiO_2$, molar ratio of $SiO_2$ to $Na_2O = 3.44$), and 13.5 kg of a 90% strength vanadium pentoxide are dissolved in the resulting mixture. The alkaline vanadium solution is added slowly to an initially taken amount of 112 liters of 37% strength by weight sulfuric acid, while stirring vigorously. The heat evolved has to be conducted away to a sufficient extent to ensure that the temperature does not exceed 35° C. This procedure gives a solution in which the $SiO_2$ has not gelled. The solution thus obtained is added to 92 kg of a kieselguhr initially taken in a high-speed mixer, and the components are mixed together. Mixing must be carried out rapidly and thoroughly, without the use of large shearing forces, until the mixture is still just moist, crumbly and free-flowing.

The mixture is then converted to extrudates having a diameter of 6 mm, and the extrudates are dried at 130° C. and calcined at 600° C. The properties of the resulting catalysts are summarized in Table 1 below and are compared with those of Example 1B.

(B) Comparative Example 17.8 kg of 90% strength vanadium pentoxide are dissolved with 60.3 kg of 48% strength potassium hydroxide solution, and 5.0 kg of 98% strength by weight NaOH are then added to the solution. The resulting solution is added to 120.5 kg of 32% strength by weight sulfuric acid, as described in (A).

Immediately thereafter, the suspension is kneaded with 113 kg of kieselguhr to give a homogeneous material, which is then converted to extrudates having a diameter of 6 mm. The extrudates are dried at 130° C., broken up, and calcined at 600° C. The properties of the resulting product are listed in Table 2.

Table 1 below lists the contents of the individual components in the two ready-prepared calcined catalysts and in the moist crumbly material (referred to as a mixture in the Table) as well as the amounts of starting materials on the basis of pure materials and according to the recipe.

TABLE 1

| Example A | Content (%) of the ready-prepared calcined catalyst | kg (100% strength) | Content (%) in the mixture | Recipe kg starting materials |
|---|---|---|---|---|
| $V_2O_5$ | 6.1 | 12.15 | 3.5 | 13.0 of 90% strength $V_2O_5$ |
| $K_2O$ | 9.9 | 19.5 | 5.6 | 41.5 of 56% strength KOH |
| $Na_2O$ | 2.4 | 4.8 | 1.4 | from the water glass |
| $H_2SO_4$ | 26.8 | 53.1 | 15.4 | 143.5 of 37% strength $H_2SO_4$ (= 112 l) |
| Kieselguhr | 46.5 | 92.0 | 26.7 | 92 of guhr |
| $SiO_2$ | 8.1 | 16.1 | 4.8 | 58 of 27% strength Na water glass |
| $H_2O$ | — | 147.0 | 42.6 | — |
| **Example B** | **Content (%) of the ready-prepared calcined catalyst** | **Starting materials, kg (100% strength)** | **Content (%) in the mixture** | **Recipe kg** |
| $V_2O_5$ | 7.9 | 16.0 | 5.1 | 17.8 of 90% strength $V_2O_5$ |
| $K_2O$ | 12.0 | 24.3 | 7.7 | 60.3 of 48% strength KOH |
| $Na_2O$ | 2.4 | 4.9 | 1.6 | 5.0 of 98% strength NaOH |
| $H_2SO_4$ | 22.0 | 44.6 | 14.1 | 120.5 of 37% strength $H_2SO_4$ |
| Kieselguhr | 55.7 | 113.0 | 35.7 | 113.0 of guhr |
| $H_2O$ | — | 113.8 | 36.0 | — |

TABLE 2

| | $V_2O_5$/% | Conversion $C_{450°\,C.}$/% | $C_{spec.}$/% $g^{-1}$ | Pore volume/ $cm^3g^{-1}$ | Hardness/ kg | Abrasion/% fresh | Abrasion/% after 50 days |
|---|---|---|---|---|---|---|---|
| Example A | 6.4 | 95.5 | 29.3 | 0.72 | 5.9 | 0.6 | 13.8 |
| Example B | 7.9 | 94.3 | 18.4 | 0.48 | 4.8 | 1.2 | 28.0 |

Table 2 compares the properties of the catalyst prepared in accordance with (A) with those of the catalyst prepared in accordance with (B). The difference between the two Examples is that in (A), in addition to the silica carrier, a water glass solution which only gels on drying is incorporated, whereas the catalyst described under (B) contains, as the silica component, only the component introduced with the carrier.

It can be seen that the catalyst according to (A) has a higher activity while containing a smaller amount of active component, and is harder and has a longer life.

EXAMPLE 2

Strength-increasing component: silica sol (40% by weight of $SiO_2$ in $H_2O$)

The procedure described in Example 1A is followed, except that, instead of sodium water glass, 40.5 kg of a 40% strength by weight silica sol are used and 4.6 kg of $Na_2O$ in the form of NaOH are added at the beginning.

In this case too, the ready-prepared 6 mm extrudates exhibit greater hardness coupled with increased pore volume and a higher specific conversion, as shown in Table 3 below.

TABLE 3

| | $C_{spec.}$/%$g^{-}$ | Pore volume /$cm^3\,g^{-1}$ | Hardness /kg | Abrasion /% |
|---|---|---|---|---|
| Example 2 | 24.7 | 0.67 | 6.3 | 2.0 |

TABLE 3-continued

| | $C_{spec.}$/%g⁻ | Pore volume /$cm^3\ g^{-1}$ | Hardness /kg | Abrasion /% |
|---|---|---|---|---|
| Example 1B | 18.4 | 0.48 | 4.5 | 1.5 |

EXAMPLE 3

Strength-increasing component: potassium water glass 22.4 kg of 48% strength by weight potassium hydroxide solution are stirred into 88.5 kg of a dilute potassium water glass (24.4% of $SiO_2$, molar ratio of $SiO_2$ to $K_2O=3.48$), and 6.3 kg of solid NaOH and 13.5 kg of a 90% strength by weight vanadium pentoxide are dissolved in the mixture obtained. The alkaline vanadium solution is added to 143.5 kg of a 37% strength sulfuric acid, similarly to Example 1A, and the mixture is converted, together with 86.5 kg of kieselguhr to hollow extrudates having an external diameter of 10 mm and an internal diameter of 5 mm. In Table 4, the properties of the resulting product are compared with those of hollow extrudates having the same dimensions and prepared by a procedure similar to that of Example 1B.

TABLE 4

| | $V_2O_5$/% | Conversion $C_{450°\ C.}$/% | $C_{spec.}$/% $g^{-1}$ | Pore volume/ $cm^3g^{-1}$ | Hardness/ kg | Abrasion fresh |
|---|---|---|---|---|---|---|
| Example 3 | 6.4 | 86.2 | 25.9 | 0.54 | 8.1 | 3.1 |
| Procedure similar to Example 1B | 7.9 | 85.6 | 19.7 | 0.48 | 5.8 | 3.5 |

The results show that the novel process not only has the advantages described in Examples 1A and 2 but also can be very readily used for the production of very hard thin-walled moldings.

Table 5 below summarizes the contents of the individual components in the ready-prepared catalyst and in the moist crumbly material (referred to as a mixture) as well as the amounts of 100% strength starting materials and the amounts and the actual recipe.

TABLE 5

| | Content (%) of the ready-prepared calcined catalyst | Starting materials kg (100% strength) | Content (g) in the mixture | Recipe kg |
|---|---|---|---|---|
| $V_2O_5$ | 6.1 | 12.1 | 3.6 | 13.5 of 90% strength $V_2O_5$ |
| $K_2O$ (WG) | | 9.75 | | from water glass |
| $K_2O$ | 10.6 | 11.3 | 5.8 | 22.4 of 60% strength KOH |
| $Na_2O$ | 2.4 | 4.8 | 1.3 | 6.3 of 98% strength NaOH |
| $H_2SO_4$ | 26.7 | 53.1 | 14.7 | 143.5 of 37% strength $H_2SO_4$ |
| Guhr | 43.4 | 86.5 | 24.0 | 86.5 of guhr |
| $SiO_2$ (WG) | 10.6 | 21.6 | 6.0 | 88.5 of 24% strength K water glass |
| $H_2O$ | | 161.6 | 44.8 | |

We claim:

1. A process for the preparation of a catalyst for the oxidation of sulfur dioxide to sulfur trioxide, said catalyst consisting essentially of a silica-based carrier on which is supported an active substance containing vanadium and alkali metal compounds, said process comprising: dissolving vanadium pentoxide in an alkali solution, acidifying the solution with sulfuric acid, mixing the acidified solution with the carrier, molding the mixture, drying and calcining, wherein (a) the vanadium pentoxide solution used additionally contains a dissolved alkali metal silicate, silica sol or mixtures thereof (b) this solution is brought to ph<2 by adding the solution to the required amount of sulfuric acid, the temperature being kept below 35° C., and (c) the acidified solution is immediately mixed with the solid silica-based carrier to give a moist crumbly material, which is then immediately molded, with the proviso that, (d) the moist crumbly material contains from 2 to 6% by weight of $V_2O_5$ and from 35 to 45% by weight of $H_2O$ and has a total $SiO_2$ content of from 15 to 50% by weight, from 5 to 25% by weight of the total silica having been introduced into the moist crumbly material together with the solution from (a).

2. The process of claim 1, wherein the sulfuric acid has a concentration of from 20 to 40% by weight.

3. The process of claim 1, wherein the temperature is kept at 15°-30° C.

* * * * *